US012582938B2

(12) United States Patent
Johansen et al.

(10) Patent No.: US 12,582,938 B2
(45) Date of Patent: Mar. 24, 2026

(54) SYSTEM AND METHOD FOR DRY SORPTION

(71) Applicant: Norwegian Emission Abatement Technologies AS, Oslo (NO)

(72) Inventors: Raymond Johansen, Sørumsand (NO); Geir Wedde, Oslo (NO)

(73) Assignee: Norwegian Emission Abatement Technologies AS, Oslo (NO)

( * ) Notice: Subject to any disclaimer, the term of this patent is extended or adjusted under 35 U.S.C. 154(b) by 320 days.

(21) Appl. No.: 18/264,555

(22) PCT Filed: Feb. 9, 2022

(86) PCT No.: PCT/NO2022/050037
§ 371 (c)(1),
(2) Date: Aug. 7, 2023

(87) PCT Pub. No.: WO2022/173310
PCT Pub. Date: Aug. 18, 2022

(65) Prior Publication Data
US 2024/0042373 A1 Feb. 8, 2024

(30) Foreign Application Priority Data
Feb. 10, 2021 (NO) .................................... 20210171

(51) Int. Cl.
*B01D 53/10* (2006.01)
*B01D 53/83* (2006.01)

(52) U.S. Cl.
CPC ............. *B01D 53/10* (2013.01); *B01D 53/83* (2013.01); *B01D 2253/104* (2013.01); *B01D 2258/025* (2013.01); *B01D 2259/40001* (2013.01)

(58) Field of Classification Search
CPC . B01D 53/10; B01D 53/68; C25C 3/22; B01J 20/08
See application file for complete search history.

(56) References Cited

U.S. PATENT DOCUMENTS 3,664,935 A 5/1972 Johnson
4,770,752 A 9/1988 Gianfranco
(Continued)

FOREIGN PATENT DOCUMENTS

CA 2250753 A1 * 4/1999
DE 3235559 A1 5/1984
(Continued)

OTHER PUBLICATIONS

Norwegian Search Report for NO20210171, issued Sep. 10, 2021.
(Continued)

*Primary Examiner* — Sharon Pregler
(74) *Attorney, Agent, or Firm* — Flener IP & Business Law

(57) ABSTRACT

The present invention relates to a system (100) for dry sorption. The system comprises a gas inlet (130) through which exhaust gas from processing industry is flowing into the system (100), a velocity increasing device which is arranged downstream of the gas inlet (130), and a reaction chamber (140) is arranged downstream of the velocity increasing device. The exhaust gas is brought into contact with the sorbent from a sorbent distributor (150) in the reaction chamber (140), wherein the velocity increasing device is a booster (110) and comprises a plurality of resistances to the flow of gas for creation of a turbulent flow of exhaust gas at the outlet of the booster for enhanced sorption. Further, the present invention0relates to a method for cleaning exhaust gas from processing industry utilizing the system (100) for dry sorption.

20 Claims, 10 Drawing Sheets

(56)          References Cited

U.S. PATENT DOCUMENTS

| | | | | |
|---|---|---|---|---|
| 8,821,823 | B2 * | 9/2014 | Jankura | B01D 53/505 |
| | | | | 423/244.07 |
| 2016/0332117 | A1 | 11/2016 | Gutperl et al. | |

FOREIGN PATENT DOCUMENTS

| | | | |
|---|---|---|---|
| EP | 2407228 | A1 | 1/2012 |
| EP | 3569301 | A1 | 11/2019 |
| SU | 967525 | A1 | 10/1982 |
| SU | 1657913 | A1 | 6/1991 |
| WO | 9615846 | A1 | 5/1996 |
| WO | 2007003778 | A1 | 1/2007 |
| WO | 2008010206 | A1 | 1/2008 |
| WO | 2015073475 | A1 | 5/2015 |

OTHER PUBLICATIONS

PCT Third Party Observations for PCT/NO2022/050037, submitted anonymously on Apr. 17, 2023.
UKIPO Search Report for GB2104631.3, dated Sep. 29, 2021.
International Search Report for PCT/NO2022/050037, mailed Apr. 27, 2022.

* cited by examiner

SYSTEM AND METHOD FOR DRY SORPTION

THE TECHNICAL FIELD OF THE INVENTION

The present invention relates to a system for dry sorption. The system comprises a gas inlet through which exhaust from processing industry is flowing into the system, a velocity increasing device which is arranged downstream of the gas inlet, and a reaction chamber is arranged downstream of the velocity increasing device. The exhaust is brought into contact with the sorbent from a sorbent distributor in the reaction chamber.

The present invention further relates to a method for cleaning exhaust gas from (a process of electrolysis of aluminum) processing industry utilizing the system for dry sorption, the method comprises the step of:

feeding exhaust gas from a processing industry through a gas inlet into the system, bringing a sorbent into the flow of exhaust gas downstream the gas inlet, mixing the sorbent with the flow of exhaust gas ensuring a sorption of gaseous substances and potential pollutants of the exhaust with the sorbent thus forming a mix of cleaned gas, particles and particles with the sorbed gaseous substances, filtration of the gas and fumes, sorbent particles and particles with sorbed substances, separating the sorbent from the cleaned gas, bringing and recycling the sorbent into the flow of gas downstream the gas inlet, further removing the gaseous substances and pollutants from the system for cleaning gasses and fumes.

BACKGROUND OF THE INVENTION

It is known from processing industry gas cleaning processes in order to remove, purify, store or destruct harmful emissions of by-products, or recycle valuable components of the exhaust to the process. Reactor systems and solutions for gas treatments exists. There are also known gas treatment plants utilizing a dry a process gas consisting of a reactor stage followed by a filtration stage. Furthermore, it is known to use the raw material of alumina ($Al_2O_3$) in powder form as sorbent in the dry sorption process for cleaning the gas evolved from electrolysis of aluminium.

In electrolysis of aluminium harmful fluoride containing gases evolve together with other substances. However, fluorides are important and essential additives to the electrolysis process of aluminium and gas cleaning processes recover the fluorides from the fume gas to be recycled back to the electrolysis process, is valuable besides the important environmental perspective.

The alumina is added to the process gas in a reactor where the gaseous fluoride is adsorbed on to the alumina. The alumina with adsorbed fluoride is later separated from the gas stream in a filter stage and transported to the electrolytic process.

All global aluminium smelters use this process. It is far the most cost-efficient process as it recovers fluorides, a component in the electrolysis of aluminium, directly on the alumina, the raw material. Wet processes have been used but now outdated.

EP0793527B1 describes a method for separating substances from a gaseous medium by dry adsorption and for recovery purposes, impurities, such as fluorine containing gases and dust, from gas emitted from a process for aluminium production. The method comprises two stages of adsorption, a first stage of adsorption wherein the fluorine containing substances is mixed with and brought into contact with particulate aluminium oxide for separating the fluorine containing substances from the gas. The first stage is followed by a separation of the adsorbed fluorine containing substances from the gas before the gas is transferred to a second stage of adsorption wherein remaining fluorine containing substances in the gas and other gases such as sulphur oxide are being adsorbed and separated before the gas is discharged to the atmosphere.

U.S. Pat. No. 4,534,778 describes an installation for injecting a powdery material being an adsorbent material into a vertical contact column through which gas laden with polluting effluents flows. Said gas laden to be fixed on said adsorbent material. The installation comprises means opening into the column for injecting said adsorbent material. Said means comprises a number of nozzles, spaced apart, for injection the adsorbent material.

CN101054695B describes a process and an apparatus for exhaust gas purification using aluminium powder as adsorbent. The powder distributer utilizes a two-phase flow wherein powder and air are distributed into the gas flow through nozzles distributed around the circumferences of a venturi tube with which exhaust gas from the aluminium electrolysis is flowing. This arrangement is exposed to wear and tear due to the Coanda-effect along the tube walls and extra power is need from e.g. pressurized/compressed air.

CN101054694 describes a two-stage feeding method and apparatus for purification of exhaust gas from aluminium electrolysis.

WO 2008/010206 A1 describes a method and an apparatus for removal of pollutants from an upwardly flowing gas stream by injecting an adsorbent in a countercurrent direction of the gas stream in a turbulent area of the gas stream while a laminar gas stream is created along the walls of the apparatus in order to avoid adsorbent particles from impinging the column walls.

Many reactor systems and solutions require long retention times to achieve sufficient sorption rates due to inefficient mixing of sorbent into the gas streams, increasing the reactor size and the costs.

In addition, sorbents may erode the equipment in contact with the gas because of the abrasiveness of the adsorbent. The resulting product of the sorbent and the sorbate may change the chemistry of the sorbent and lead to agglomeration forming scales and substances with fouling behaviour.

Unevenness of the gas flow distribution in the reactor endangers sorbent fall through where low flow is dominant and with the result of accumulation in the upstream systems like inlet ducts with implication of clogging and further increase the unevenness of the gas flow (skewed gas flow profile).

Thus, there is a need for a system and a method to overcome these problems mentioned above.

OBJECTS OF THE INVENTION

An object of the present invention is to provide a system improving the sorption rate.

Another object of the present invention is to reduce the risk of erosion and fouling.

Yet another object of the present invention is to improve gas distribution in the system to reduce fall-out of sorbent falling through the reactor into the inlet duct below.

A further object of the present invention is to enhance sorption efficiency of the system.

Yet another object of the present invention is to improve efficiency of cooling the gas as gas temperature has demonstrated to increase the emission from the gas treatment plant for the aluminium electrolysis. The emission increases nearly exponential with gas temperature.

Another object of the present invention is combined cooling and heat recovering in addition to the improved adsorption rate. The temperature of the exhaust is in the order of 120-180° C. constantly increasing as the aluminium electrolysis develops. It is advantageous for the gas cleaning process to reduce the temperature of the gas and at the same time recover the heat in the gas stream. The recovered heat can be used for electricity production or as heat source for many important applications (district heating/cooling, desalination of seawater, fish farms etc.).

SUMMARY OF THE INVENTION

In the following throughout the specification, the following terms means:

The term "sorption" used in this specification means both adsorption and absorption binding of gaseous substances (sorbates) on the surface of the sorbent and/or absorption and subsequent chemical reaction with the sorbent into a new substance.

The term "sorbent" used in this specification means both adsorbent and absorbent.

The term "sorbent fall-out" or "sorbent fall through" used in this specification means sorbent falling through the reactor and into the inlet duct below.

The term "velocity increasing device" also called "booster" used in this specification is a section of the reactor which includes a plurality of venturis increasing the velocity of the gas and creating a turbulent zone downstream of the booster.

The term dry scrubber or dry sorption and dry system mean both dry and semi-dry systems where semi-dry means a dry sorbent that been mixed with water or other fluids before added in the reactor.

The term "resistances" used in this specification means resistances to flow formed by the walls/solid body of the plurality of venturis formed by tubes, rings or slots, wherein the flow of gas is arranged downstream of the inlet duct of the sorption system.

The term "reaction chamber" used throughout this specification means the chamber downstream of the booster wherein the incoming exhaust gas that has flown through the booster is being mixed and thus reacted with the sorbent distributed in the reaction chamber.

The term "sorbent distributor device" or "sorbent distributor" is a device ensuring a feed and distribution of sorbent to the gas in the reaction chamber device.

One or more of the objects and advantages are achieved by a solution as defined in the independent claims. Preferred embodiments are also defined in the dependent claims.

In a first aspect, the present invention is thus related to a system for dry sorption, the system comprising:

a gas inlet through which exhaust from processing industry is flowing into the system, a velocity increasing device arranged downstream of the gas inlet, a reaction chamber arranged downstream of the velocity increasing device, wherein the exhaust gas is brought into contact with the sorbent from a sorbent distributor in the reaction chamber and wherein the velocity increasing device is a booster and comprises a plurality of resistances to the flow of gas for creation of a turbulent flow of gas at the outlet of the booster for enhanced sorption.

The plurality of resistances is a plurality of venturis.

The plurality of venturis is an arrangement of a plurality of parallel tubes of circular elliptical, square or rectangular form arranged symmetrically in circular, elliptical, square or rectangular duct.

Alternatively, the plurality of venturis is a plurality of concentrically arranged circular rings.

In another alternative, the plurality of venturis is a plurality of concentrically arranged oval rings.

In yet another alternative, the plurality of venturis is a plurality of concentric square rings. Each square ring is preferably having rounded corners.

The venturis may have a step at the exit end, said step may be a flat surface perpendicular to the longitudinal axis of the venturis.

The reaction chamber may comprise a cooling system, wherein said cooling system may comprise a tube arrangement downstream the sorption distributor.

A cooling media may be air, water or oil. The cooling media may flow outside the tube walls of the tube arrangement providing cooling of the gas and the sorbent.

The system may further comprise heat recovery system recovering the heat from the cooling of the gas and sorbent.

The system may further comprise a filtering system for filtering the sorbent from the gas. The filtering system may comprise at least one from the elements of settling chambers, cyclones and filters.

The ordering of the selected elements may be settling chambers, cyclones and filters.

The system may further comprise at least one further downstream system for dry sorption, wherein at least one of the downstream systems for dry sorption are connected in series.

One stage may comprise a filtering system for filtering the sorbent from the gas and the filtered sorbent may be reinserted into a reaction chamber of at least one subsequent downstream system for dry sorption.

The filtered sorbent may be cooled prior to being reinserted into a reaction chamber of at least one subsequent downstream system for dry sorption.

The sorbent may be introduced in least one subsequent downstream system for dry sorption and may be at least partially fresh sorbent.

In a second aspect, the present invention is thus related to a method for cleaning exhaust gas from processing industry utilizing the system for dry sorption as described above, the method comprises the step of:

feeding exhaust gas from a processing industry through a gas inlet into the system, bringing a sorbent into the flow of exhaust gas downstream the gas inlet, mixing the sorbent with the flow of exhaust gas ensuring a sorption of gaseous substances and potential pollutants from the exhaust with the sorbent thus forming a mix of cleaned gas, particulates and sorbent with the sorbed gaseous substances, filtration of the gas and fumes, particulates, sorbent particles and sorbent with sorbed substances, separating the sorbent from the cleaned gas, bringing and recycling the sorbent into the flow of gas downstream the gas inlet, further removing the gaseous substances and pollutants from the system for cleaning gasses.

The mixing of the sorbent with the flow of gas comprises a step of creating a turbulent gas flow into which the sorbent is introduced.

In a third aspect, the present invention is thus related to the use of the method described above, wherein the exhaust gas is evolving from a process of electrolysis of aluminum utilizing the system for dry sorption, the sorbent being fresh alumina ($Al_2O_3$).

The enhanced gas sorption is achieved through effective mixing of the gas with the sorbent through a created and controlled turbulent zone in which the mixing is taking place. The turbulent zone is created at the outlet of a velocity increasing device/booster through which the exhaust gas is passing. The booster comprises a plurality of venturis forming resistances to the flow ensuring an increased evenness and increased velocity of the gas flow across the booster creating the turbulence downstream the booster. This turbulence consists of many mini-swirls that ensures an advanced and enhanced mixing of the adsorbent with the exhaust gas and gaseous substances. For the aluminium electrolysis these substances are among others hydrogen fluorides (HF) and sulphur dioxides ($SO_2$). These substances are captured and bonded onto the surface of the alumina which is used as the adsorbent.

The mass transfer rate is significantly increased by the advanced mixing of the sorbent into the gas stream. The mixing zone and retention time are thereby being minimized, and strong controlled mixing is achieved avoiding risks of fouling and erosion of equipment in contact with the gas and sorbent mixture. Such a reactor technology has cost, space and operational benefits.

The booster is balancing (evens out) the gas flow velocity distribution across the reactor as it introduces a plurality of parallel flow resistances in the system. Downstream of the booster the effect of the created mini-swirls increases the overall turbulence of the system and improves the mixing of the sorbent in the gas stream which increases the mass transfer and sorption rate of the system.

For improved removal of gaseous substances, a compartment with a system of parallel tubes the gas is processed further in a turbulent flow for enhanced removal of gaseous substances. Preferably a coolant (e.g. water, oil, air etc.) will flow through the compartment to remove or recover heat from the gas flowing through the tubes. Reduced temperature of the gas has been shown to reduce the emission of pollutants as gaseous fluorides from a system treating exhaust from electrolysis of aluminum. The increased turbulence resulting from the increased velocity through the tubes of the mixture of sorbent and the treated gas in the upstream system will further enhance the removal of gaseous substances and pollutants from the gas stream.

Minimizing the emission of gaseous fluorides into the atmosphere has many positive effects, as reducing both local and global environmental aspects of pollution. There are also economic effects and advantages in returning fluorides back into the electrolysis cells (recovery of valuable fluorides an essential component of the electrolysis bath).

BRIEF DESCRIPTION OF THE DRAWINGS

Embodiments of the present invention will now be described, by way of examples only, with reference to the following schematic diagrams wherein.

DETAILED DESCRIPTION OF EMBODIMENTS DISCLOSED IN THE DRAWINGS

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a method for mixing a sorbent with a stream of gas.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Figure 1:
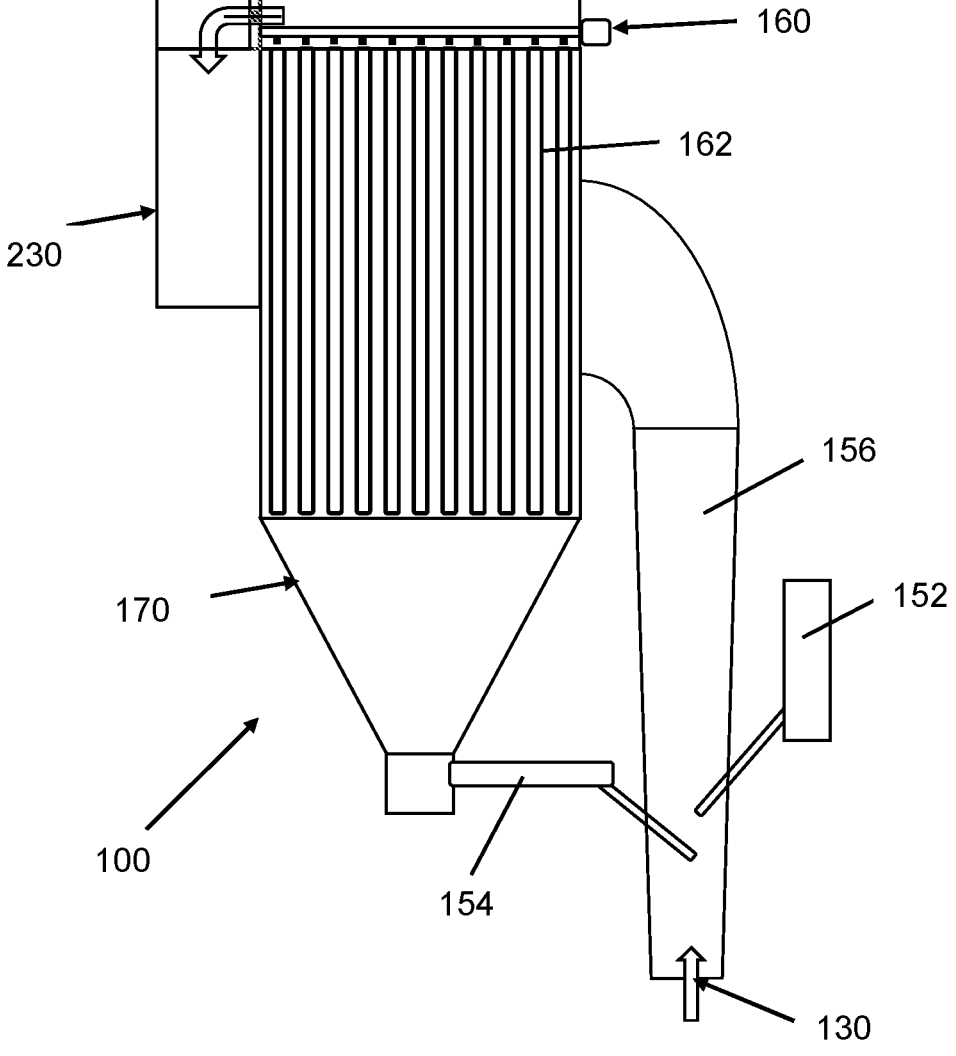
FIG. 1 shows schematically prior art of an installation of a typical gas cleaning system.

FIG. 1 shows schematically prior art of an installation of a typical gas cleaning system 100 of a gas cleaning process of exhaust gases evolving from an industrial process, e.g. electrolysis of aluminum. Gases evolving from the electrolysis is treated in a system utilizing a dry sorption process, also called dry scrubbing, in order to remove harmful gas components as gaseous fluorides from the exhaust gas before the gas is entering the atmosphere. A powder material of alumina (a raw material of the production process) is used as sorbent (adsorbent) to react with the exhaust gas in the sorption process. The adsorbent is either fresh alumina or recycled alumina with adsorbed fluorides from the dry sorption process. Exhaust gas is evolving from the electrolysis into the system 100 through a gas inlet 130 and into a sorption reactor 156. Downstream the gas inlet 130 a sorbent, either fresh 152 or recycled 154, is fed or injected into the sorption reactor 156 through a sorbent distributor 150. The gaseous fluorides are being adsorbed from the exhaust gas onto the alumina surface before the gas flow together with the alumina with the adsorbed fluorides is entering a filter system 160. In the filter system 160, e.g. being a system of filter bags 162, the alumina with adsorbed fluorides are separated from the gas. The purified gas is released into a gas outlet 230 and further into the atmosphere. The alumina with adsorbed fluorides is extracted from the filter bags 162 and into a filter hopper 170. The filter hopper 170 is receiving the adsorbed material, and recycled adsorbent may be reintroduced through a feeder 154 in the vertical reactor chamber. After being separated from the gas stream by the filter bags, the alumina with adsorbed fluorides will be fed to the electrolysis of aluminium recovering and recycling valuable fluorides required by the electrolysis.

Figure 2:
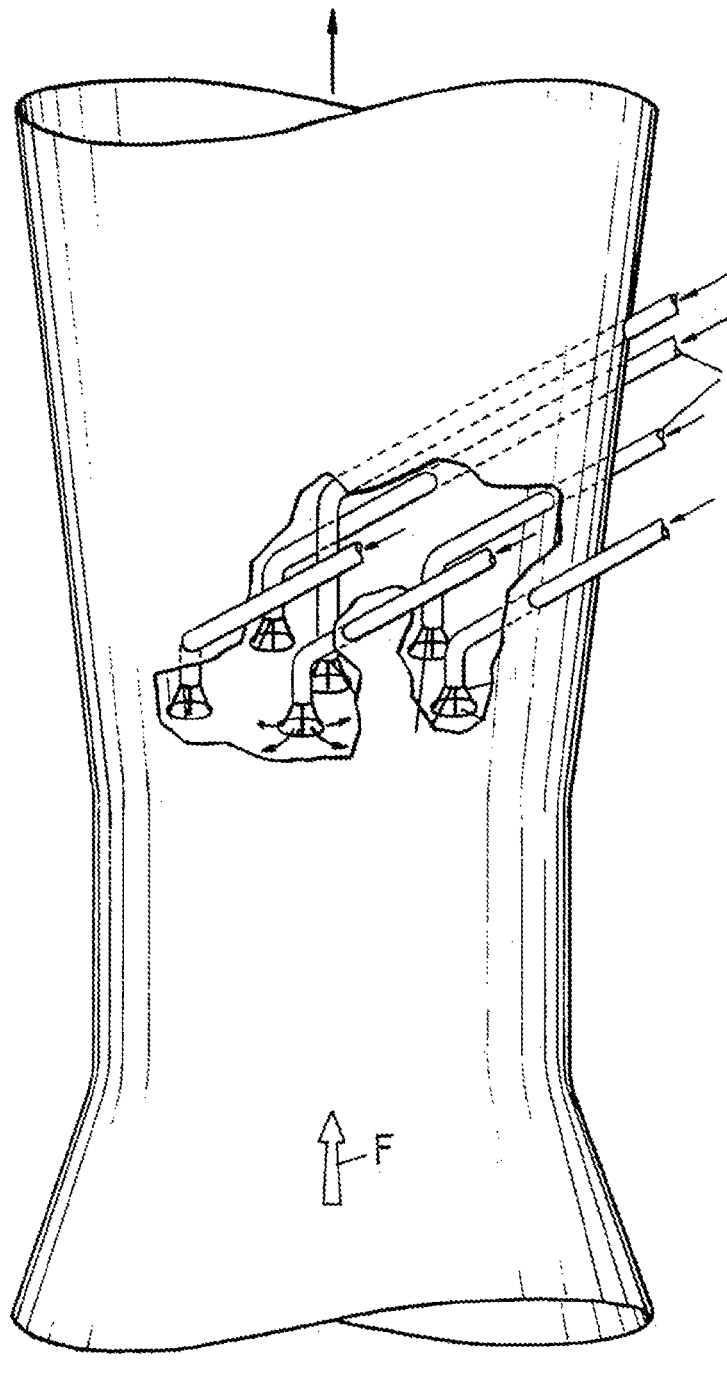
FIG. 2 shows schematically and in perspective prior art of an installation for injecting a sorbent (powdery material) into a vertical contact reactor.

FIG. 2 shows prior art of an installation for injecting a powdery material into a vertical contact reactor through which flows gas laden with polluting substances which is desired to be adsorbed to said powdery material. The installation comprising means for injecting fresh and/or recycled material into the column. The means comprises a plurality of nozzles injecting fresh or recycled material, the nozzles disposed in the column are having diffuser devices arranged at a distance from the outlet of the nozzles by means of rods. The diffuser devices being in the form of flat and horizontal plates. Thus, fresh or recycled material is being discharged by the nozzles is projected onto these plates and is dispersed from the plates out into the flow of rising gas laden with polluting effluents.

Principles Forming the Basis of the Invention

The core of the invention is the use of effective means to form strong turbulence in the exhaust gas from an industrial process such as aluminium electrolysis where a sorbent such as alumina particles is introduced, in order to improve sorption rate without causing erosion of the system due to the abrasive effect of the sorbent particles. First, alumina is fed and distributed into the gas duct and then later captured in a filter system 160, e.g. a filter bag system.

A gas sorption where dry, or semi-dry sorbent is added to a gas stream is dependent of the strength of the mixing and downstream retention time for efficient contact and subsequent sorption of the sorbate (gaseous substances). The rate of sorption (mass transfer) depends on the mixing strength and the affinity of binding the sorbate to the surface of the sorbent (adsorption) and further chemical reaction of the sorbate and the sorbent (absorption). The mass transfer rate can be increased by an advanced mixing of the sorbent into the gas stream.

A gas velocity increasing device is utilized in order to form turbulence. The velocity increasing device being a booster 110 is used as the effective means to form turbulence of the exhaust gas. The booster 110 is having a booster inlet end 112 and a booster exit end 114 and comprises a plurality of parallel venturis 120. The booster 110 creates a turbulent flow downstream of the booster 110. In a further embodiment a step is provided at the exit end 114 that further boosts the turbulent flow of exhaust gas leaving the exit end 114. This step is typically a flat surface between a venturi 120 and adjacent venturis 120. In the venturi 120 the gas velocity increases, reducing the static pressure of the gas while increasing the dynamic pressure. When the gas leaves the booster 110, jets of gas will be ejected into the open space of the sorption reactor enclosed by a reactor wall. Within the gas surrounding the jets there will be a higher static pressure that will feed gas into the beams/jets, effectively creating mini-swirls 210, increasing the static pressure of the jets until this pressure is equalised with the static pressure of the surrounding gas. The jets will dissipate and thus have the same pressure and velocity as the surrounding gas. This relationship determines the reach of the jets.

Along the wall of the reactor the gas can be subject to the Coanda effect unless there is sufficient distance to the wall. The Coanda effect takes place when the gas along the wall adds less gas to the jets than the gas between the jets and thus the jets deflect towards the reactor wall and then follow the wall closely. This will reduce efficiency and can also cause erosion of the wall. The inventors have realised that by ensuring the distance between the wall and the venturi must be greater than half the distance between the venturis. In such a system the jets are instead deflected away from the wall and towards a neighbouring jet. When two spaced jets, the space having a higher static pressure, gas will be fed in towards both jets, the jets will not depart in direction, but reticulate in a fan-shape. This avoids scale growth and/or erosion of the wall. Within the jet bundle adjacent jets will interact and offset this effect and the jets will flow unaffected until the jets dissipate and reach the same velocity as the surrounding gas.

A sorbent is fed into a reaction chamber 140 and dispersed into the gas through a sorbent distribution device 150.

BEST MODES OF CARRYING OUT THE INVENTION

The main principle of the invention is that a sorbent is dropped into a gas and separated in a downstream filter.

Figure 3:
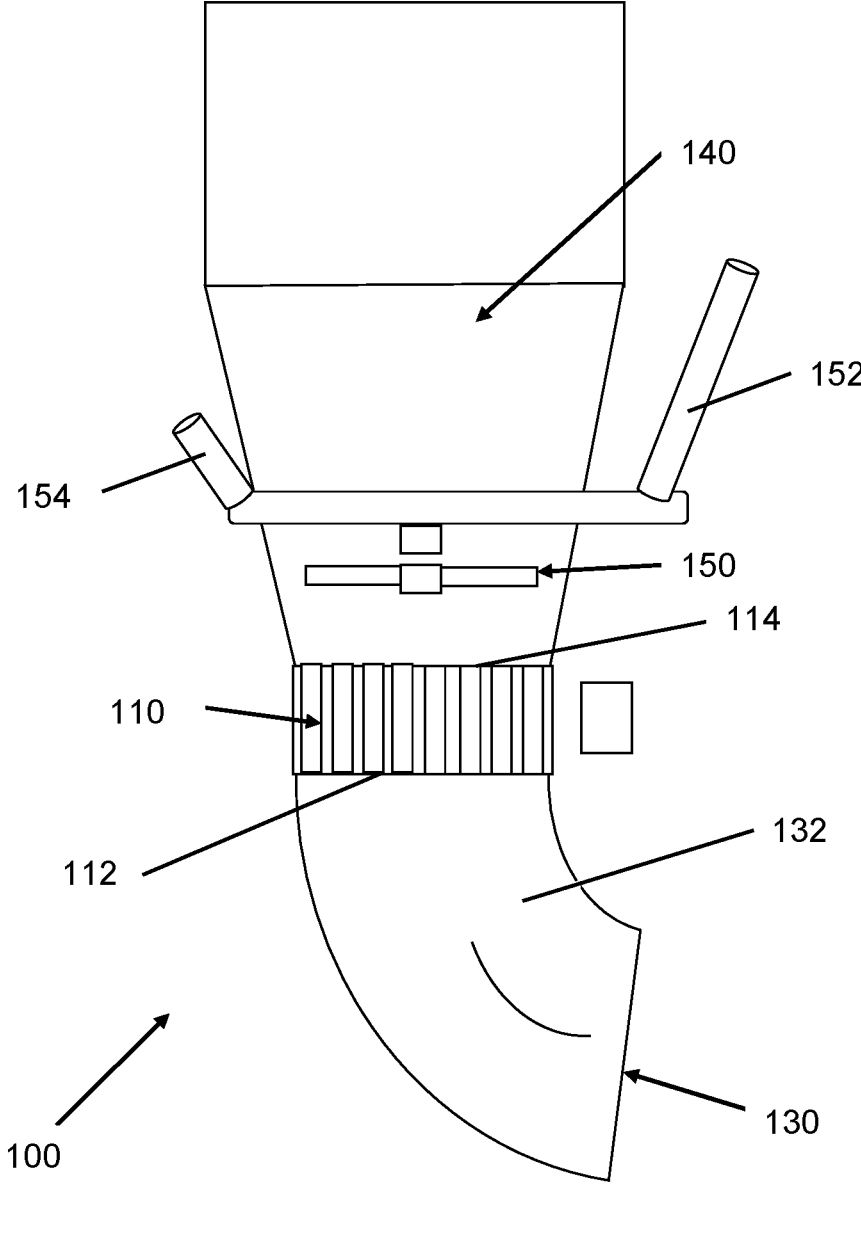
FIG. 3 shows schematically a section view of an embodiment of the system for cleaning of gases according to the present invention.
Figure 5:
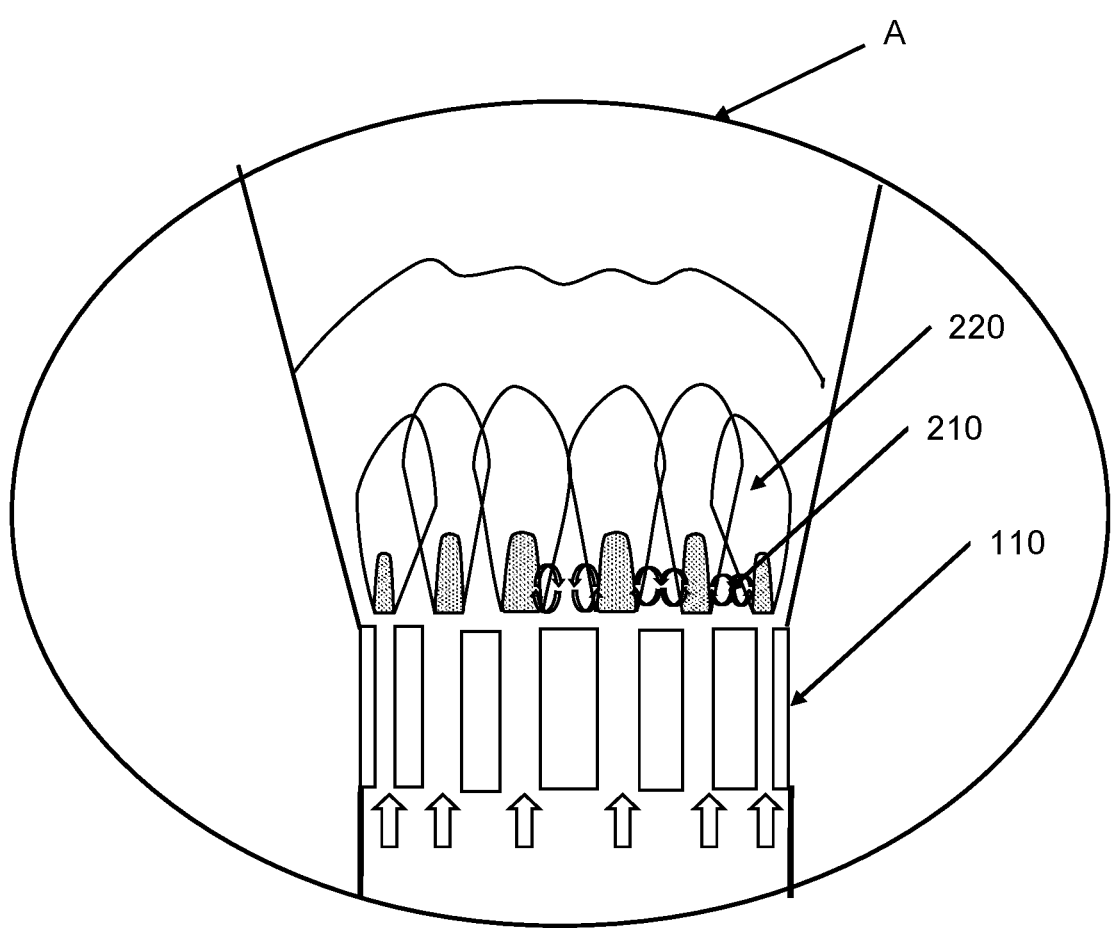
FIG. 5 shows a detailed view A from FIG. 4.

FIG. 3 shows schematically a section view of an embodiment of the system 100 for cleaning gases according to the present invention. The system is utilizing a dry sorption process in order to remove harmful gas substances (such as gaseous fluorides) from the flue gas in order to release a purified gas to the atmosphere. In a sorption process a sorbent is injected into a flow of flue gas and the gaseous substances may be sorbed by the sorbent. In order to enhance the sorption rate, a booster 110 is introduced into the system 100. The booster 110 is a device to increase the velocity of the exhaust gas before it enters the reaction chamber 140. The increased velocity is achieved through the booster 110 comprising a plurality of venturis arranged in parallel downstream an inlet duct 132. The plurality of venturis may be formed by a plurality of tubes, rings or slots as shown in FIGS. 8A-G. The venturis do, by their walls, represent resistances to flow, forcing the flow of the exhaust gas through a narrowed space and thus increasing the velocity of the gas flow. The increased velocity creates a turbulence downstream the booster 110 as it suddenly expands into the reactor chamber. The turbulence increases the impact of the sorbent to collide and interreact with the gaseous substances to be sorbed (collected by the sorbent) from an enhanced and stronger mixing and thus efficient mass transfer is achieved. The system 100 comprises an exhaust gas inlet 130, wherein the gaseous pollutants from an aluminium electrolysis process is entering the gas cleaning system 100, the booster 110 for increasing the velocity of the gas flowing from a gas inlet 130 towards a sorbent distributor 150 arranged downstream an inlet duct 132, downstream a booster outlet 114. The sorbent distributor 150 is arranged in a duct projecting from the booster outlet 114 of the booster 110. The sorbent distributor 150 is receiving the sorbent from a sorbent feed of fresh or recycled sorbent 152,154, respectively. The duct is forming a reaction chamber 140 enclosed by reaction chamber walls 142. The booster 110 being an arrangement of e.g. venturis arranged as a plurality of tubes, rings or slots ensures an increased velocity of the gas contributing to form the turbulent zone at the outlet 114 of the booster 110. In the turbulent zone downstream the booster 110 the sorbent is introduced into the exhaust gas through a sorbent distributer 150, distributing the sorbent evenly across the cross section of the turbulent zone. At the booster outlet 114 of the booster 110, the gas forms high-velocity jets creating mini-swirls 210, as shown in FIG. 5, giving increased turbulence resulting in the sorbent being drawn/sucked down from a sorbent distributor 150 and down in between the gas jets. The gas jets attract the sorbent and the sorbent is transported by stream of gas further into the reactor chamber 140. A turbulating bed of sorbent is being developed directly at the outlet 114 of the booster 110. Throughfall of sorbent/sorbent fall-out into the upstream ducts and system that may lead to chocking and resistances giving rise to uneven gas flow zones is avoided due increased resistance to flow and with high velocity of gas in and out of the booster 110. The sorbent is being evenly injected into the gas flow at this turbulent zone, and due to the turbulent gas in this area, a strong mixing and an increased mass transfer rate of the gaseous substances on to the sorbent will be achieved.

The booster 110 is creating a controlled turbulent zone at the outlet 114, see FIG. 5, the turbulent zone comprises a plurality of jets 220 and mini swirls 210. The high velocity jets are creating suction (low pressure) attracting adjacent jets. For a booster 110 arranged symmetrically in circular, elliptical or rectangular ducts, as shown in FIGS. 8A-F, the attraction will balance the high velocity jets within the reaction chamber 140. Downstream the booster 110 the jets at the circumference/wall 142 of the reaction chamber 140 will attract towards the adjacent jets and away from the wall 142 of the reaction chamber 140, leaving a zone of low velocity, the velocity being close to zero along the inner surface of the wall 142 of the reaction chamber 140, resulting in a low or no risk of erosion of the wall 142. Further, the turbulent zone is efficiently avoiding agglomerating sorbent causing fouling and building of scales and deposits on the wall 142. A further effect is that it introduces a plurality of parallel resistances to flow in the venturis that balances (even out) the flow across the reactor 140 and act as a grid. The grid is reducing the cross-sectional area of the gas passage and creates resistance balancing the flow of gases. The effect of the grid is among others to introduce a plurality of parallel resistances that improves the distribution of the gas between the openings of the grid leading to a more uniform velocity downstream the grid. An even further effect of the high velocities is that they dramatically improve the vertical force (lifting) of the particles which reduces the risk for the sorbent fall-through and into ducts below and which increase the risk of choking and resistances giving rise to more uneven gas flow below and after the booster zone.

The sorbent is being transported by a sorbent feed of fresh and/or recycled sorbent 152, 154 respectively, from the sorbent area and evenly injected into the gas flow by means of the sorbent distributor device 150. Said device 150 comprising a plurality of distributing elements transporting and feeding the sorbent into the gas stream across the whole flow area of the reaction chamber 140. The distributor device 150 may be arranged as one or more star-shaped arrangements. The distributor device 150 is releasing the sorbent in controlled portions into the gas stream. As the gas passes the sorbent distributor device 150 it increases in velocity and a suction (ref. Bernoulli's principle) above it acts on the particles (sorbent) which are pulled into the gas stream. Downstream the reaction chamber 140 where the gas was mixed with the injected sorbent is followed a section for separation of the sorbent from the exhaust gas. This section may comprise at least one of settling chambers 164, cyclones 166 or filter bags 162. In a preferred embodiment the ordering is settling chamber 164 then cyclone 166 and then filter, though combinations with just two out of the three are also working. A settling chamber 164 is a simple way to remove large particles, simply by letting heavy particles settle and fall under gravity. Removal can take place without interrupting the gas flow or the process. Removing large particles by settling also means less wear in subsequent cyclones and less frequently filter bag clogging and replacement. This method also involves little gas flow resistance. A cyclone 166 is efficient in removing medium sized particles, and again removal can take place without interrupting the gas flow or the process, and also means less frequent filter bag 162 clogging and removal. Finally, a filter bag 162 is a very efficient process for removing the fine particles and avoid emissions.

In the turbulent zone above the booster 110 the mini-swirls 210 and relative velocities between the sorbent particles and the gas is at its highest which increases the physical contact between the gas molecules and the sorbent particle a pre-requisite for high sorption rate of gaseous substances on the surface of the particles. For an adsorption process the gaseous substances are attracted/bound to the particle surface while for absorption processes of gaseous substances there is a chemical reaction on the particle surface or inside the sorbent that forms a new product.

If the mixing strength is high and the sorption rate is high, the sorbent may be separated from the gas as soon as possible after mixing of sorbent, resulting in reduced equipment costs. This can be achieved by the gas flowing through a filter or other separation methods as mentioned. Preferred filter is a fabric filter consisting of a filter house and filter bags where gas mixed with sorbent flows through the filter bags which separate the sorbent from the gas stream.

If longer reaction times is necessary, i.e. longer retention or residence times, the reactor may be extended as a chamber/channel increasing the contact time for the mixture of gas and sorbent. The contact time is the time the gas flow and sorbent are mixed i.e. from time of sorbent injection until the separation by the filter bags.

If the sorption rate is moderate a need for longer intimate contact and longer contact time is required, a tube arrangement, wherein the gas again is accelerated and turbulence within the tubes is increased because of increased velocity, may be used. Such arrangement is termed lean flow reactor or "re-cooler". Further, the gas mixture may be cooled in such tube arrangement where the fluid/gas and the sorbent flow into the tubes. The cooling of the gas has been demonstrated to be favourable for certain sorption processes. Additionally, heat may be recovered as in a heat exchanger 190. The heat being recovered is a low-grade heat, and may be used to heat building etc. A preferred arrangement can be seen in FIGS. 6A-B, where tubes are arranged in parallel providing an increased velocity of the fluid/gas with improved turbulence and therefore enhanced mixing. In a preferred embodiment the system needs to cool down the gas to temperatures of 80-120° C. before it enters a last stage of filtering in order to reduce the emission of gases that sorb on the sorbent such as HF gasses and to protect the filters from the hot gas flow. The cooled gas is reduced in volume as the gas temperature is reduced thus reducing the cost of the downstream equipment/filters. The emission of HF gasses in a process of cleaning aluminium exhaust evolving from the processes in electrolysis of aluminium increases at high temperatures, i.e. increases exponential from 110° C. The cooling may also improve the sorption efficiency of the system. The sorption process continues through the tube cooler and further into a filter system 160, not shown, where the sorbent is separated from the purified gas. In the separation step (the filter) where the sorbent is captured on fabric of the filter bag creating filter cakes of sorbent. Through the cake the gas is in a strong but short intimate contact with the sorbent and further sorption occurs. The cake extension depends on the frequency of cleaning the bags. The filter cake is important in order to drive the efficiency of removing gaseous fluorides (HF) to a level of 99.8-99.9%.

Figure 4:
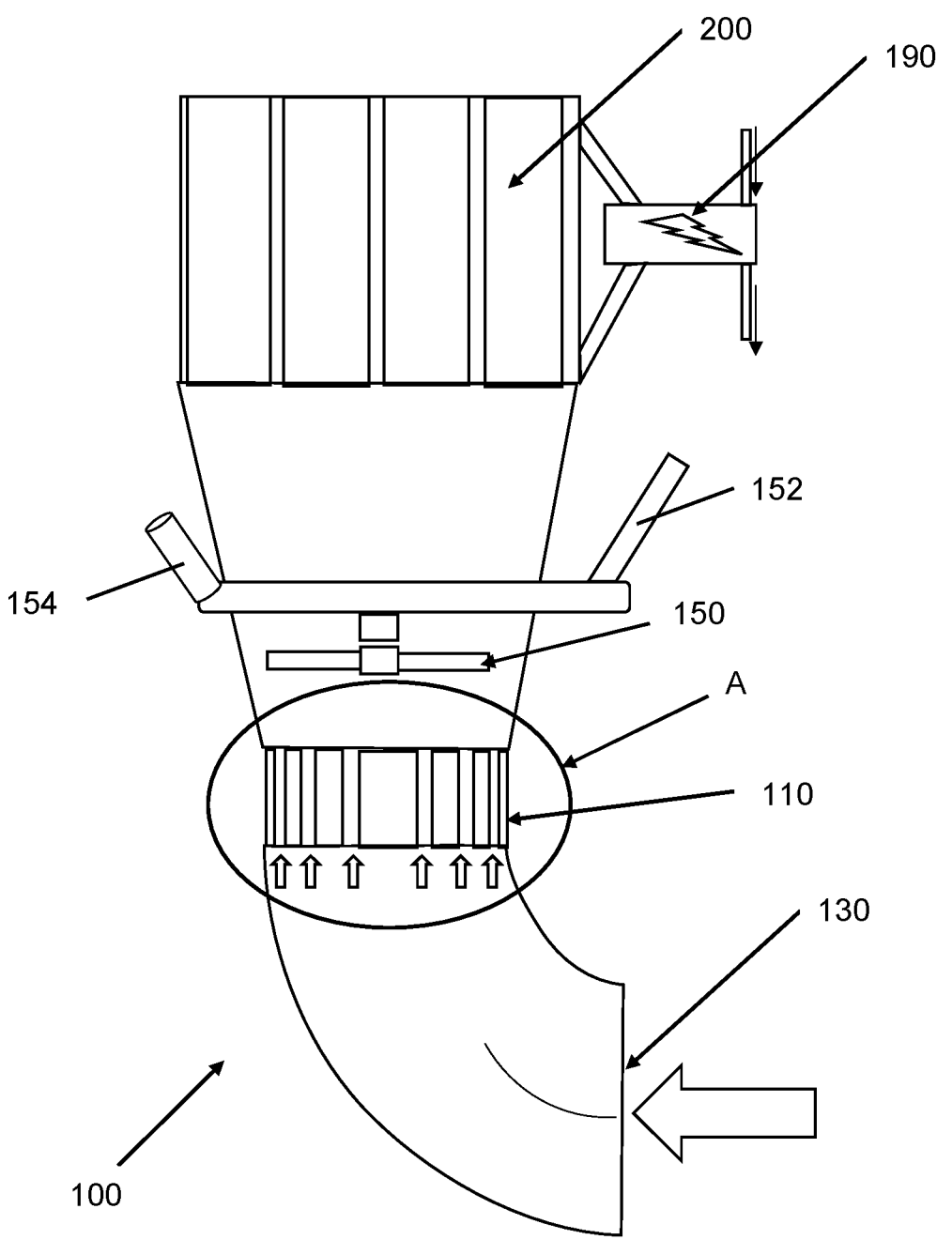
FIG. 4 shows schematically a section view of an embodiment of the system for cleaning of gases according to the present invention.
Figures 6A, 6B:
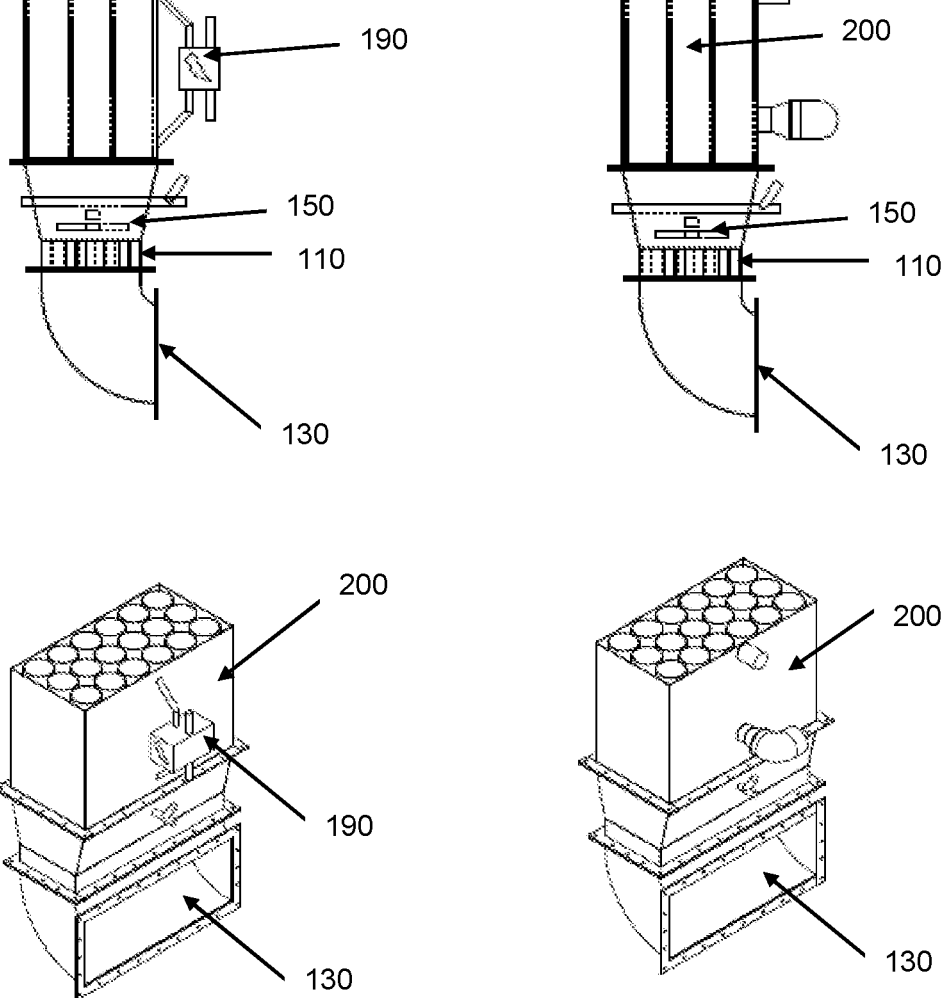
FIG. 6A shows schematically and in perspective an embodiment of the system with a cooler, the cooling media being a liquid, and 6B shows schematically and in perspective an embodiment of the system with a cooler, cooling media being ambient air.

Preferably the gas enters a cooling system 200 prior to the filtering stage, as shown in FIG. 4. The cooling system 200 might be combined with a heat exchanger system 190, recovering the heat from the system for e.g. recycling purposes as heating buildings etc. The cooling system 200 may utilize either a liquid as cooling medium, the liquid being water, oil etc. as shown in FIG. 6A or ambient air as cooling medium as shown in FIG. 6B.

For cooling the fluid, the medium can be introduced into the system and flow outside the tube walls absorbing the heat being dissipated by the tubes. The sorbent further increases the turbulence and heat transfer in the cooler. The heat absorbed by the medium may be recovered and used as heat source for energy recovery or for heating purposes.

Figure 9:
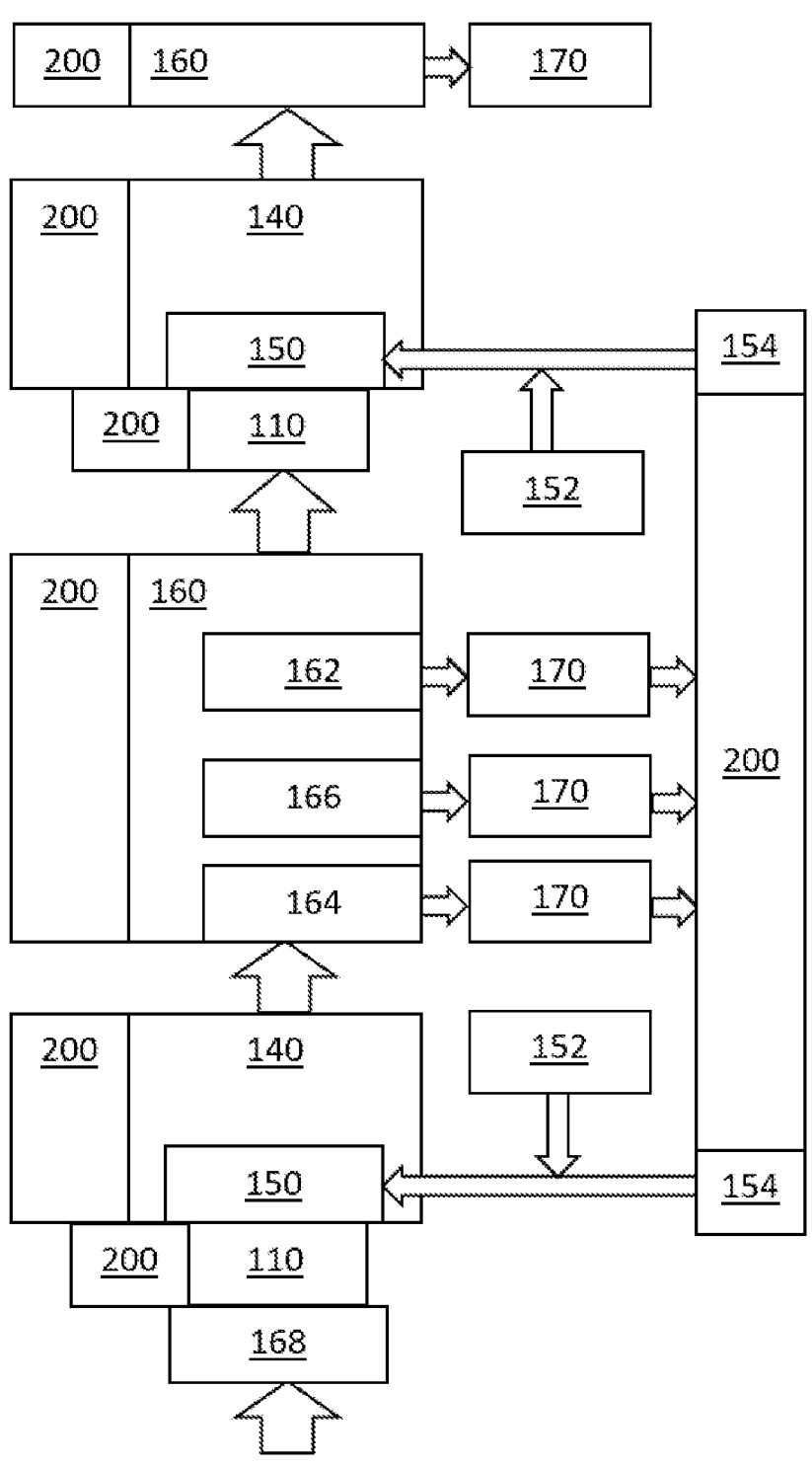
FIG. 9 shows schematically an embodiment of a compound gas cleaning system having two or more stages.

FIG. 9 shows a compound gas cleaning system, a preferred embodiment wherein a compound sorption at decreasing temperatures in employed. This comprises an optional but preferred intermediate filtering stage, and at least one subsequent secondary reaction chamber 140. Cooling means are used to lower the temperature.

In a preferred embodiment the intermediate filtering stage for the system for sorption comprises at least one from the elements of settling chambers 164, cyclone filters 166 and filter bags 162. In a more preferred embodiment this section comprises a settling chamber 164 for easy removal of the heaviest particles, followed by a cyclone 166 for removing most of the remaining particles, followed by filter bags 162.

This reactor chamber 140 can be an open reactor or a reactor for further improvement of the mixing, ensuring a further intimate contact between the sorbent and sorbate.

It is realised that reaction speed and diffusion rates increase with increasing temperatures, yet the HF concentration in a gas stream increases both with increasing temperature and increasing water content (humidity) of the gas. This is due to the generation of HF from particulate fluorides also being present in the exhaust from the aluminium electrolysis. Reducing the gas temperature will therefore reduce total HF concentration in the gas stream and therefore reduce the emission to the environment by a second processing step at a lower temperature than the initial sorption process temperature. In an embodiment the gas from the initial sorption stage is filtered in a first filtering stage and the sorbed alumina is removed from the gas. The gas is then cooled before being sent through a second booster 110 having a second reaction chamber 140 downstream of the second booster 110. The sorbed alumina removed from the gas is reintroduced to the cooled gas in the second reaction chamber 140 through a second sorbent distributor in the second reaction chamber 140.

The filtered sorbent may be cooled prior to being reinserted into the reaction chamber 140, that may be upstream or subsequent downstream. The cooled filtered sorbent will emit less gasses (fluoride gas) due to lowered temperature, leading to higher cleaning capacity as more sorbent can react with the exhaust gas. When the gas is cooled prior to the sorption stage, the cooling of the reintroduced sorbent may further contribute to improve the sorption efficiency of the system.

Downstream from the second reaction chamber 140 a second filtering section is provided. In a preferred embodiment this section comprises at least one from the elements of settling chambers 164, cyclones 166 and filter bags 164. In a more preferred embodiment this section comprises a settling chamber for easy removal of the heaviest particles, followed by a cyclone for removing most of the remaining particles, followed by filter bags.

In a two-stage process as disclosed above it is preferred that the first filtering stage does not cause excessive gas flow resistance and thus filter bags might be excluded.

Heat can be recovered in several stages such as through stage two before gaining heat from the stages between the second booster and the first reaction chamber 140 before stage one in order to provide high quality heat for recovery or other use. Alternatively, high grade heat is recovered from stage one and low-grade heat is recovered from stage two for use in separate circuits. While heat can be recovered from the walls of the chambers 140 and piping of the system, heat can also be recovered from the walls of the boosters 110. In such an embodiment the booster and heat recovery unit are one and the same unit.

Thus, a two-stage process will filter out more HF while also providing more heat recovery.

The intermediate filtering is important for several reasons. It is important to reduce the quantity of particles that passes through the boosters, as this may cause wear and abrasions. At the same time some abrasion is preferred to counter scale growth which could reduce heat exchange and increase gas flow resistance. For this reason, it is beneficial if the filtering could be adjusted according to need. Filtering is also important in order to remove HF from the gas.

In some embodiments, particles filtered out can be reintroduced into subsequent reaction chambers 140. This has the advantage that one can maximise the sorption to economise the use of sorbent. In some embodiments particles that have been filtered out can be reintroduced to a preceding reaction chamber 140. This is particularly useful where there is one filter system downstream of the reaction chamber where particles are recycled to some extent. This maximises the amount of the gas sorbed on or in the sorbent.

In some embodiments a reaction chamber is fed with fresh sorbent, recycled sorbent or a mix of fresh and recycled sorbent. The mixing ratio can be varied to maximise the sorbing process and minimise emissions. This can be done for each of the reaction chambers.

While FIG. 9 shows the use of two reaction chambers, the system can be extended by further reaction chambers and processing stages.

In some embodiments reintroduced is selected from one or more of the filtrates from the settling chamber, cyclone filter and filter bags. Typically, it is preferred to recycle the largest particles back into a reaction chamber, and such particles are usually obtained in the settling chamber and to a lesser extent in the cyclone.

In a preferred embodiment the filtrate is cooled before introduction to the secondary reaction chamber 140.

In some embodiments the filtrate is mixed with fresh sorbent before introduction to the secondary reaction chamber 140.

In a preferred embodiment only fresh sorbent before introduction to the secondary reaction chamber 140. This is especially beneficial in order to remove the last traces of HF from the gas before it leaves the system.

In many embodiments it is beneficial to use a prefilter 168
upstream from the boosters. The reason is that the exhaust at
this stage can contain particles that are undesirable for at
least one of many possible reasons. One problem is that
particles prior to the booster can cause erosion. Another
frequent problem is that these particles are hot and emit e.g.
HF into the later stages, which counters the process of
removing HF. It is also possible that these particles are of a
composition that are undesirable to return to the source such
as an aluminium electrolysis cell, whereas alumina powder
having sorbed HF is beneficial to return to the electrolysis
cell. An example is shown in FIG. 9 but use of such a filter
is not limited to a compound filtering system.

Figures 7A, 7B, 7C:
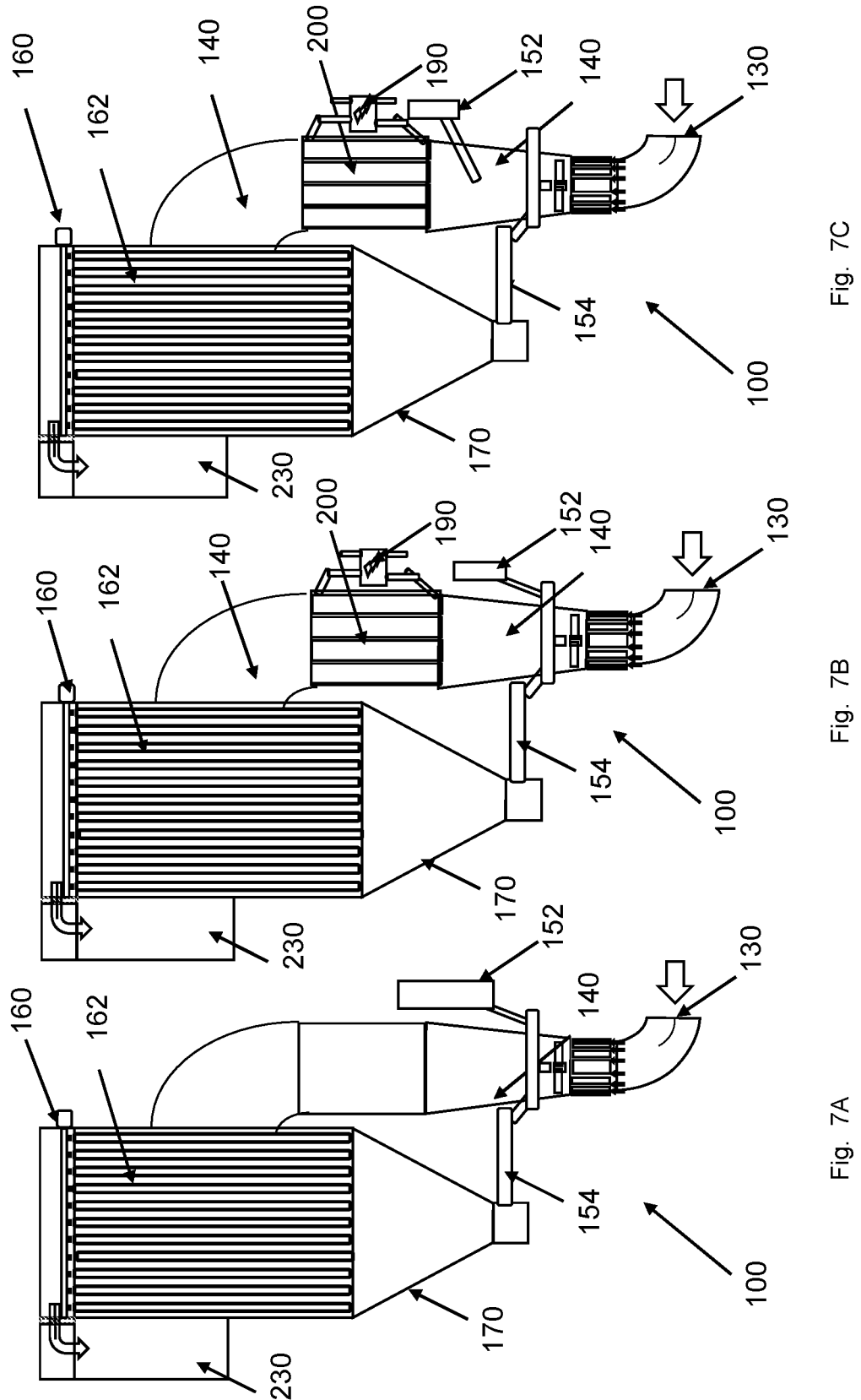
FIG. 7A-7C shows schematically installations of gas cleaning systems according to the present invention.

FIG. 7A-C shows schematically section views of instal-
lation of the system 100 for cleaning of gases according to
the present invention, the figures show the system 100 from
the sorption step until the cleaned gas is being released to the
atmosphere. FIG. 7A shows the system 100 utilizing a
one-stage process with one filtering stage. FIG. 7B showing
the system 100 utilizing a two-stage-process with two reac-
tor stages wherein fresh sorbent is released together with
recycled sorbent and FIG. 7C wherein the recycled sorbent
is released in the first stage of the two-stage process, and
wherein fresh sorbent is first released at the second stage of
the two-stage process.

Figures 8A, 8B:
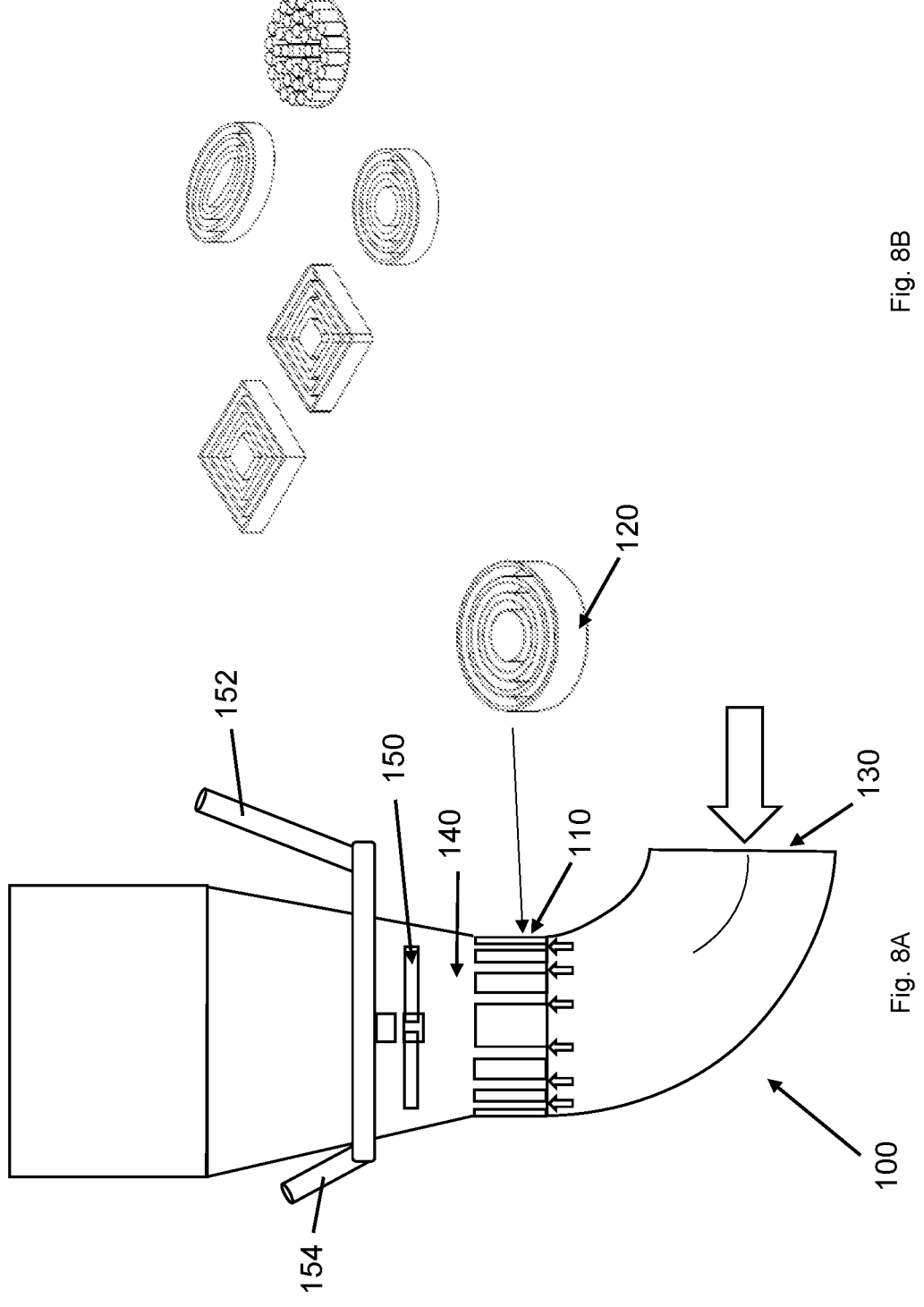
FIG. 8A shows schematically and in perspective one booster arrangement pointing to its position in the system.
FIG. 8B shows schematically and in perspective different booster arrangements.
Figure 8C:
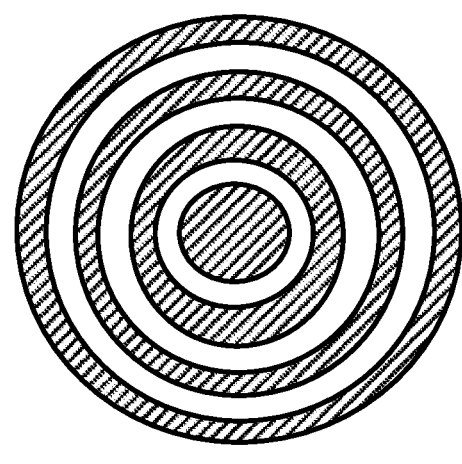
FIG. 8C-8G shows a top view of the different booster arrangements.
Figure 8D:
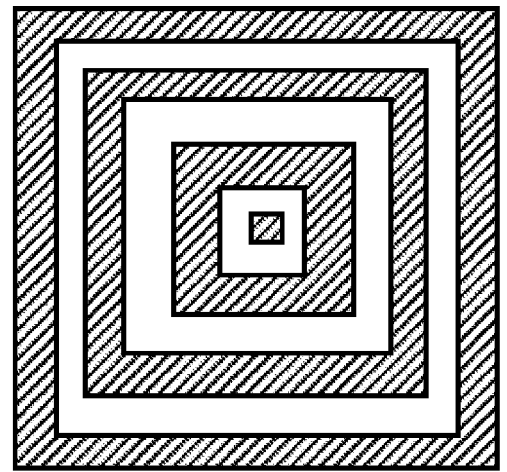
Figure 8E:
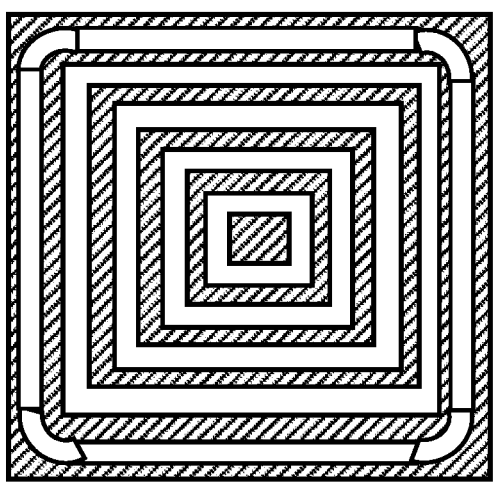
Figure 8F:
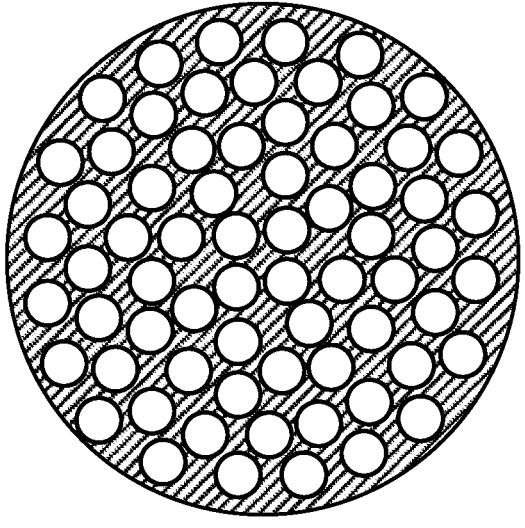
Figure 8G:
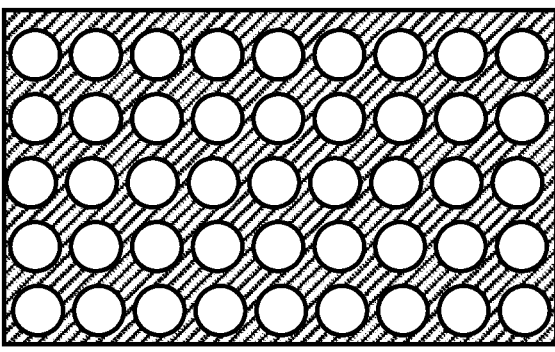

FIG. 8A shows schematically and in perspective one
booster 110 arrangement pointing to its position in the
system 100. The booster 110 arrangement comprising of a
plurality of circular and concentric compartments forming
venturis of different shapes. FIG. 8B shows schematically
and in perspective different booster 100 arrangements. FIG.
8C-8G shows a top view of the different booster 110
arrangements of FIG. 8B. FIG. 8C showing venturis formed
by a plurality circular concentric compartments forming a
booster 110. FIG. 8D showing a plurality of square concen-
tric compartments forming a booster 110 and FIG. 8E shows
the compartments of FIG. 8D with rounded corners. FIGS.
8F and 8D showing a plurality of venturis 120 formed by a
plurality of parallel tubes in a circular and rectangular
booster 110 respectively. The number of compartments
throughout FIGS. 8C-8G are not restricted to those shown,
there might be fewer or there might be more compartments.
The distance between the wall and the venturi must be
greater than half the distance between the venturis.

TABLE 1

| Component | Description |
| --- | --- |
| 100 | System |
| 110 | Booster |
| 112 | Booster inlet |
| 114 | Booster exit |
| 120 | Venturi |
| 130 | Exhaust gas inlet |
| 132 | Inlet duct |
| 140 | Reaction chamber |
| 150 | Sorbent distributor device |
| 152 | Sorbent feed of fresh sorbent |
| 154 | Sorbent feed of recycled sorbent |
| 156 | sorption reactor |
| 160 | Filter system |
| 162 | Filter bags |
| 164 | Settling chamber |
| 166 | Cyclone |
| 168 | Prefilter |
| 170 | Filter hopper |
| 180 | Sorbent recycling system |
| 190 | Heat exchanger system |
| 200 | Cooling system |
| 210 | Mini-swirls |

TABLE 1-continued

| Component | Description |
| --- | --- |
| 220 | Gas velocity contours |
| 230 | Gas outlet |
| 240 | Heat recovery system |

The invention claimed is:

1. A system for dry sorption, the system comprising:
   a gas inlet through which exhaust gas from processing
   industry is flowing into the system; and
   a velocity increasing device arranged downstream of the
   gas inlet, a reaction chamber arranged downstream of
   the velocity increasing device;
   wherein the exhaust gas is brought into contact with the
   sorbent from a sorbent distributor in the reaction cham-
   ber;
   characterized in that the velocity increasing device is a
   booster and comprises a plurality of resistances to the
   flow of gas for creation of a turbulent flow of exhaust
   gas at the outlet of the booster for enhanced sorption.

2. The system according to claim 1, wherein the plurality
of resistances is a plurality of venturis.

3. The system according to claim 2, wherein the plurality
of venturis is an arrangement of a plurality of parallel tubes
or circular, elliptical, square or rectangular form arranged
symmetrically in circular, elliptical or rectangular duct.

4. The system according to claim 2, wherein the plurality
of venturis is a plurality of concentrically arranged circular
rings.

5. The system according to claim 2, wherein the plurality
of venturis is a plurality of concentrically arranged oval
rings.

6. The system according to claim 2, wherein the plurality
of venturis is a plurality of concentric square rings.

7. The system according to claim 6, wherein each square
ring has rounded corners.

8. The system according to claim 2, wherein the venturis
have a step at the booster outlet end, said step being a flat
surface at perpendicular to the longitudinal axis of the
venturis.

9. The system according to claim 1, wherein the reaction
chamber comprises a cooling system, said cooling system
comprising a tube arrangement downstream the sorption
distributor.

10. The system according to claim 9, wherein a cooling
media, being air, water or oil, flows outside the tube walls of
the tube arrangement providing cooling of the gas and
sorbent.

11. The system according to claim 10, wherein the system
comprises a heat recovery system recovering the heat from
the cooling of the gas and sorbent.

12. The system according to claim 1, wherein the system
further comprises a filtering system for filtering the sorbent
from the gas.

13. The system according to claim 12, wherein the filter-
ing system comprises at least one from the elements of
settling chambers, cyclones and filter bags.

14. The system according to claim 13, wherein the order-
ing of the selected elements is settling chambers, cyclones
and filter bags.

15. The system according to claim 1, wherein the system
further comprises at least one further downstream system for
dry sorption, wherein at least one of the downstream systems
for dry sorption are connected in series.

16. The system according to claim 15, where one stage comprises a filtering system for filtering the sorbent from the gas, wherein the filtered sorbent is reinserted into a reaction chamber of at least one subsequent downstream system for dry sorption.

17. The system according to claim 16, where the filtered sorbent is cooled prior to being reinserted into a reaction chamber of at least one subsequent downstream system for dry sorption.

18. The system according to claim 15, where the sorbent introduced in least one subsequent downstream system for dry sorption is at least partially fresh sorbent.

19. A method for cleaning exhaust gas from processing industry utilizing the system for dry sorption according to claim 1, the method comprising the steps of:

feeding exhaust gas from a processing industry through a gas inlet into the system;

bringing a sorbent into the flow of exhaust gas downstream the gas inlet;

mixing the sorbent with the flow of exhaust gas ensuring a sorption of gaseous substances and potential pollutants from the exhaust with the sorbent thus forming a mix of cleaned gas particulates and sorbent with the sorbed gaseous substances;

filtration of the gas and fumes, particulates, sorbent particles and sorbent with sorbed substances;

separating the sorbent from the cleaned gas; and bringing and recycling the sorbent into the flow of gas downstream the gas inlet, further removing the gaseous substances and pollutants from the system for cleaning gasses and fumes;

characterized in that the mixing of the sorbent with the flow of gas is comprising a step of creating a turbulent gas flow into which the sorbent is introduced.

20. Use of a method according to claim 19, wherein the exhaust gas is evolving from a process of electrolysis of aluminum utilizing the system for dry sorption, the sorbent being fresh alumina.

* * * * *